Oct. 17, 1933.   W. W. SLOANE   1,930,694
POWER SHOVEL
Original Filed Nov. 11, 1929   11 Sheets-Sheet 1

Inventor
William W. Sloane
Clarence F. Poole
Attorney

Oct. 17, 1933.         W. W. SLOANE         1,930,694
                        POWER SHOVEL
       Original Filed Nov. 11, 1929    11 Sheets-Sheet 2

Inventor
William W Sloane
Clarence F. Poole
Attorney

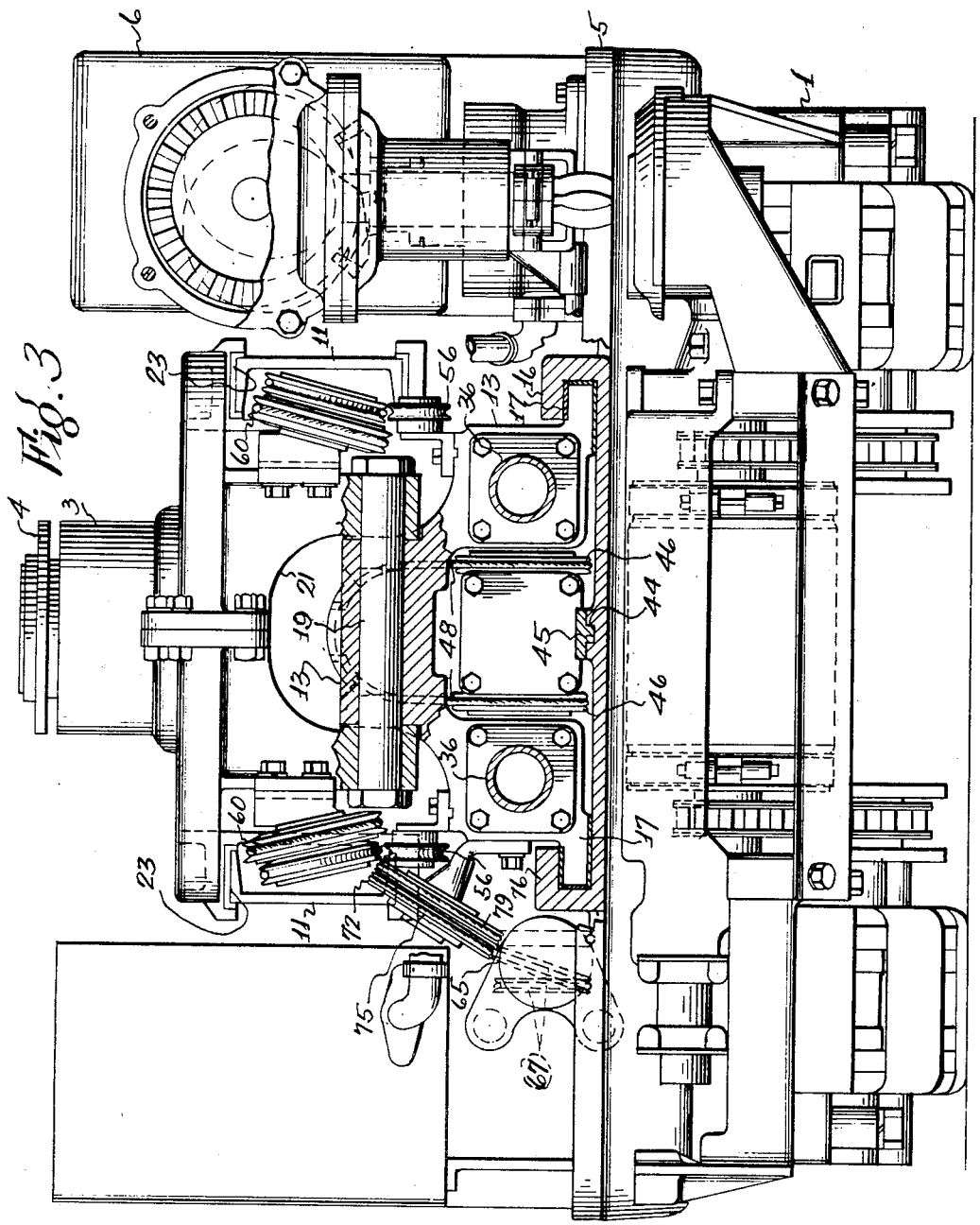

Oct. 17, 1933.    W. W. SLOANE    1,930,694
POWER SHOVEL
Original Filed Nov. 11, 1929    11 Sheets-Sheet 4
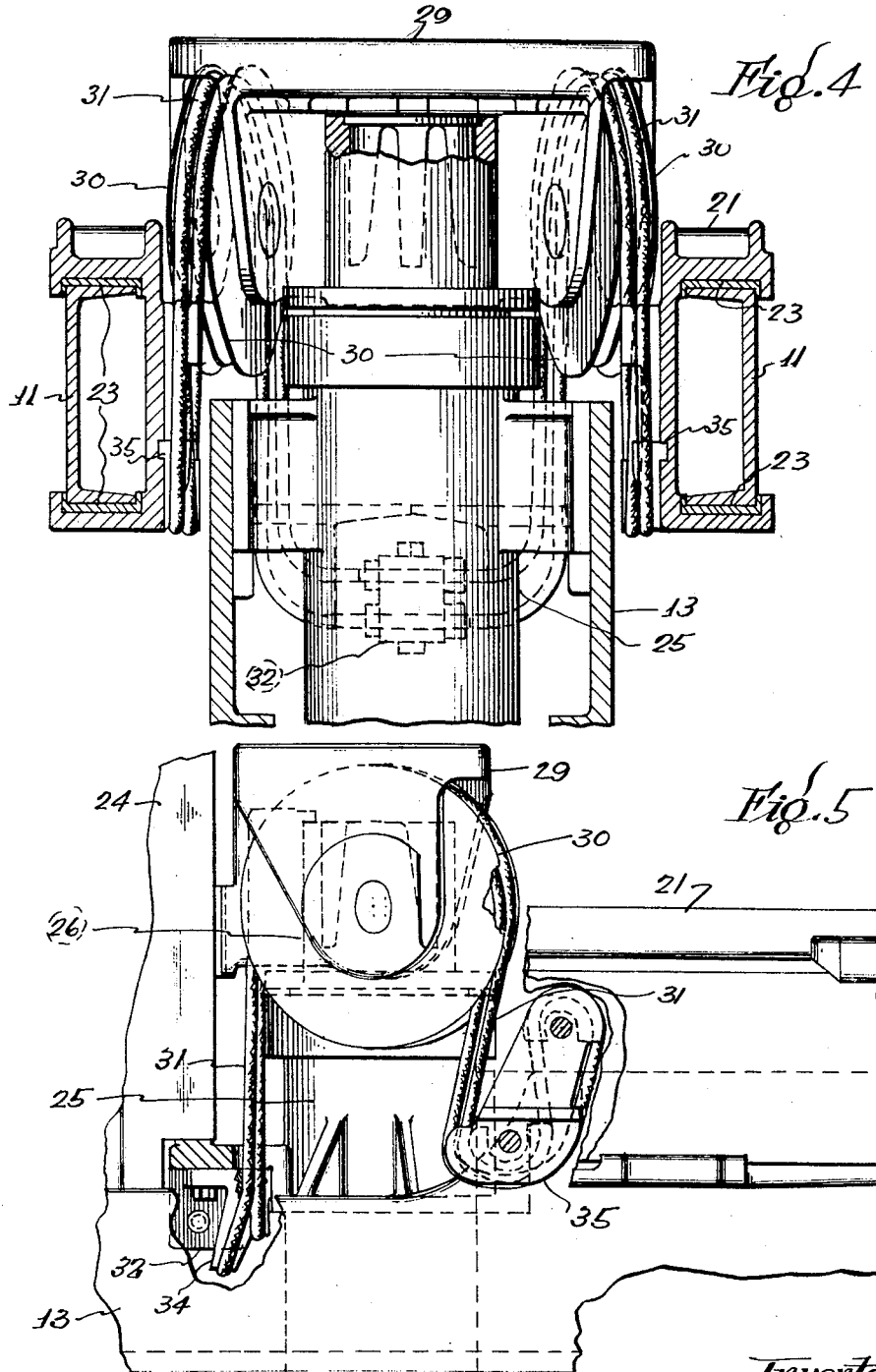
Inventor
William W. Sloane
by Clarence F. Poole
Attorney

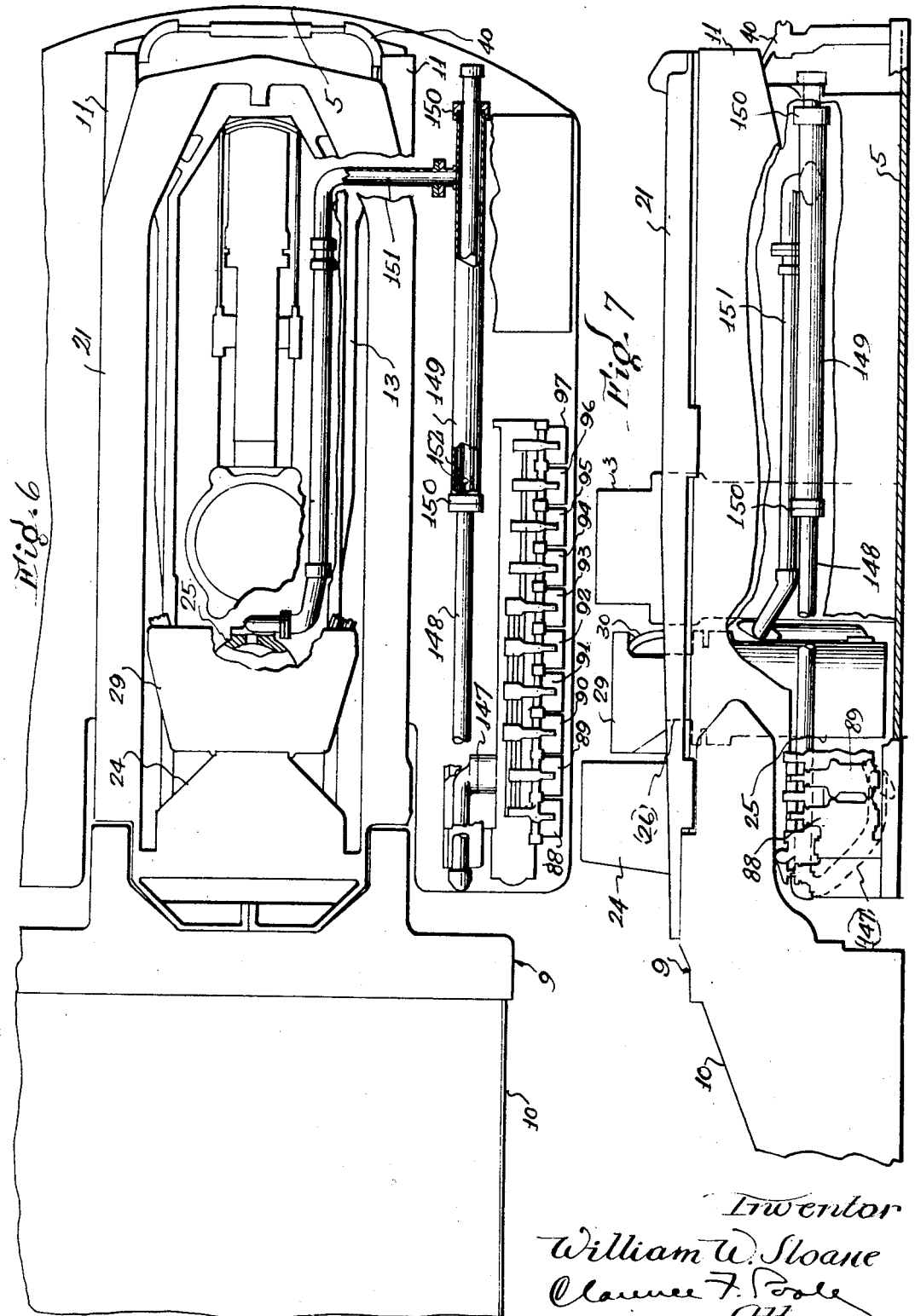

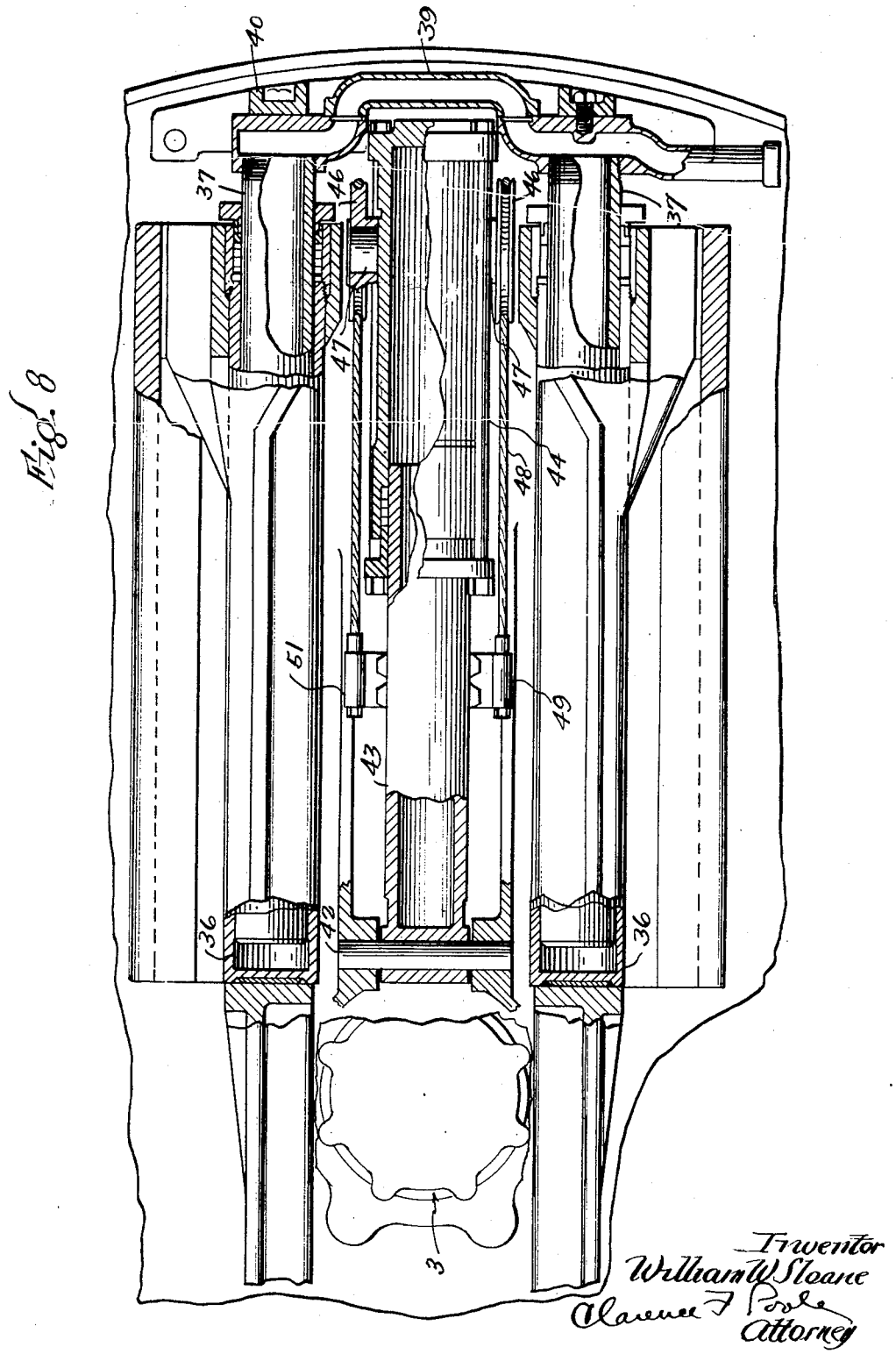

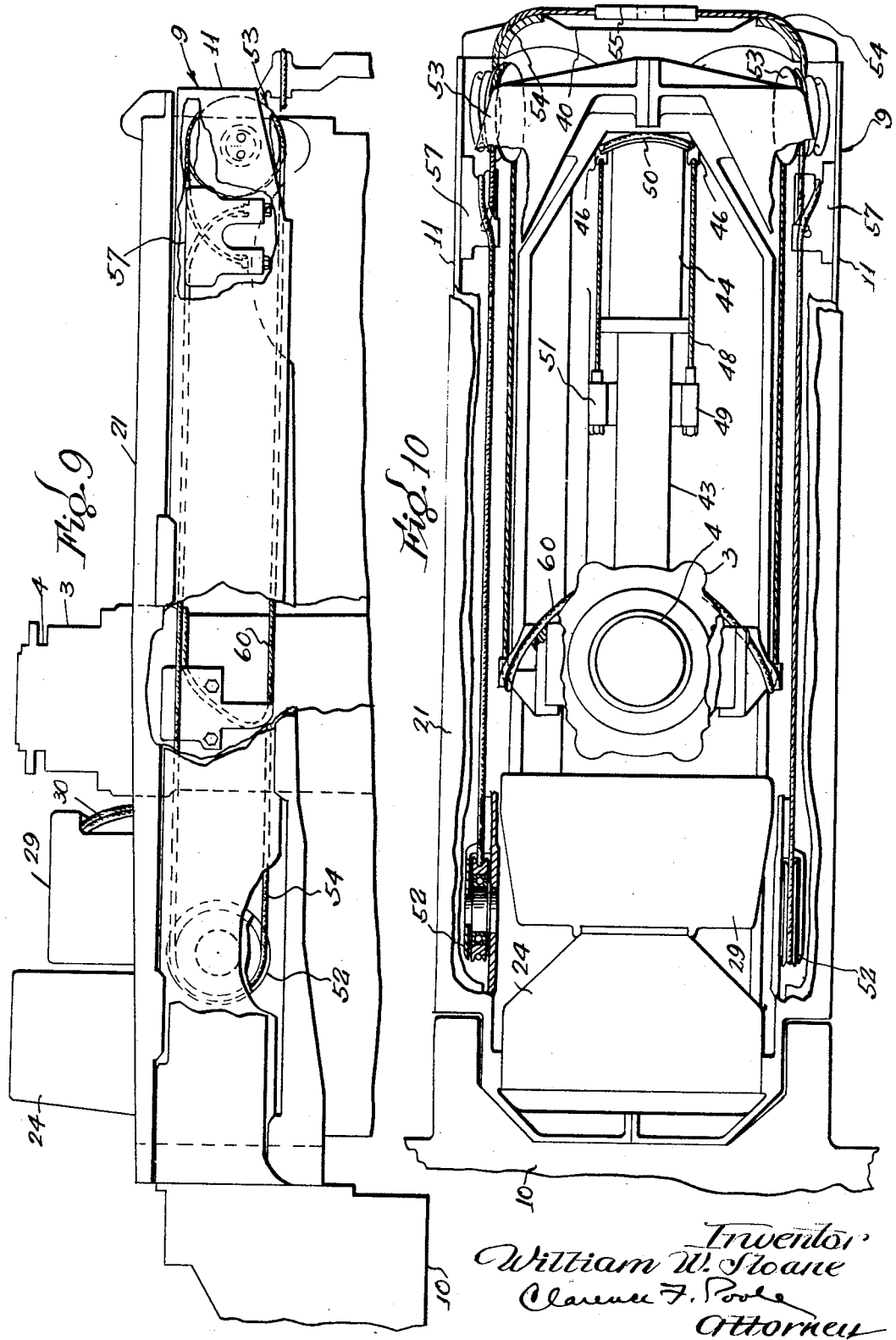

Oct. 17, 1933.  W. W. SLOANE  1,930,694
POWER SHOVEL
Original Filed Nov. 11, 1929   11 Sheets-Sheet 8
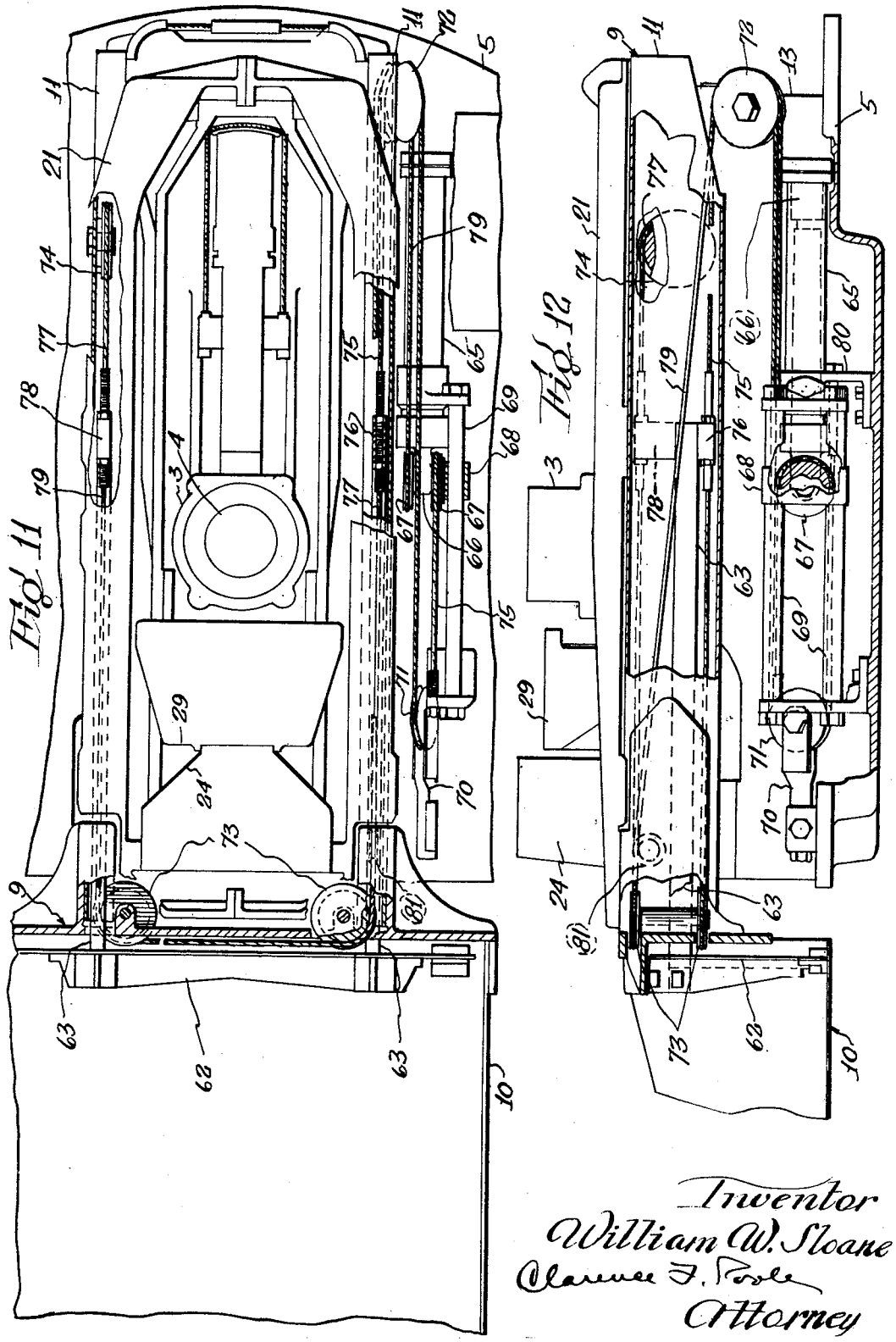
Inventor
William W. Sloane
Clarence F. Poole
Attorney

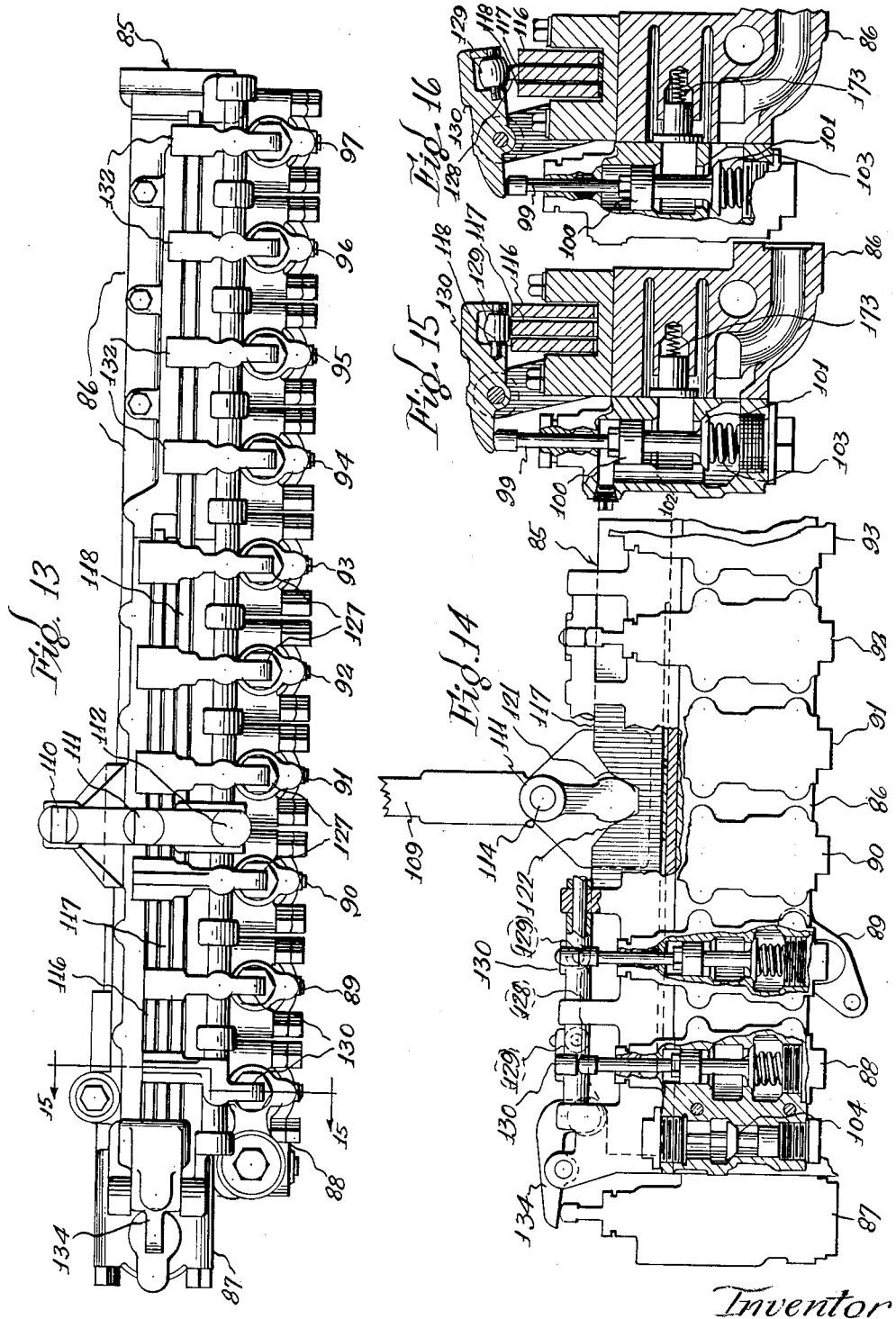

Oct. 17, 1933.  W. W. SLOANE  1,930,694
POWER SHOVEL
Original Filed Nov. 11, 1929  11 Sheets-Sheet 10
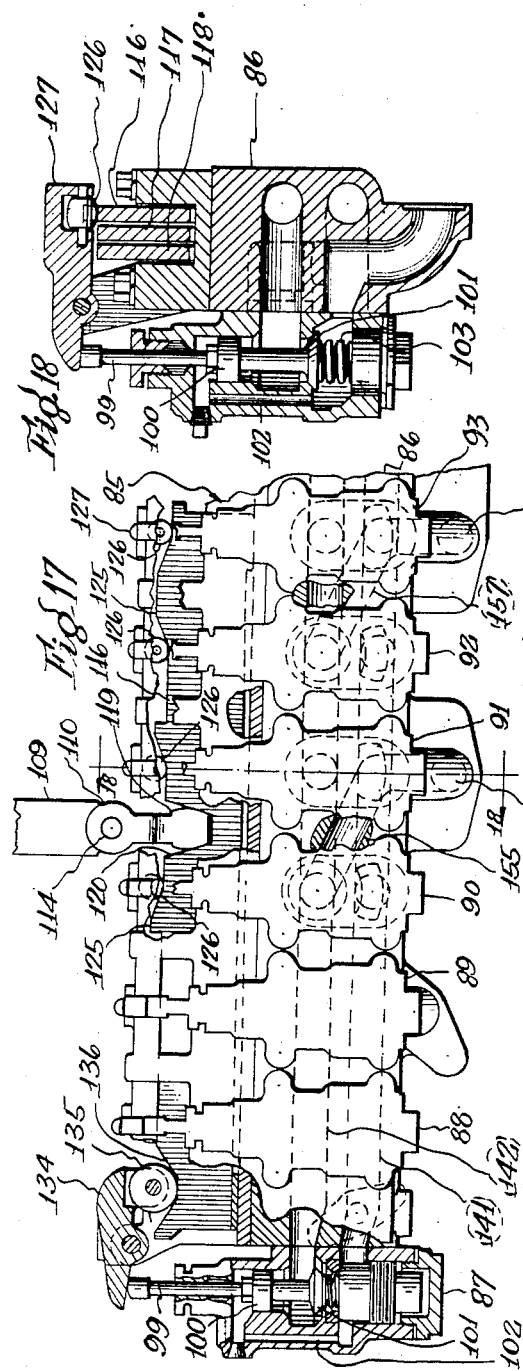
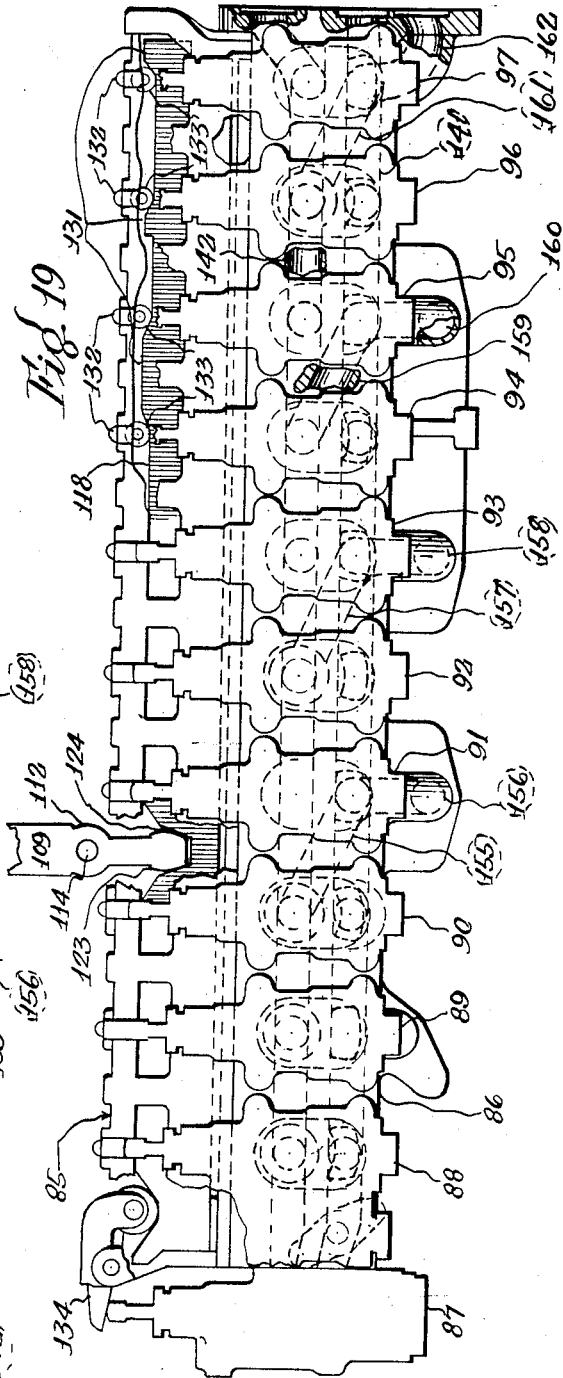
Inventor
William W. Sloane
Clarence F. Poole
Attorney

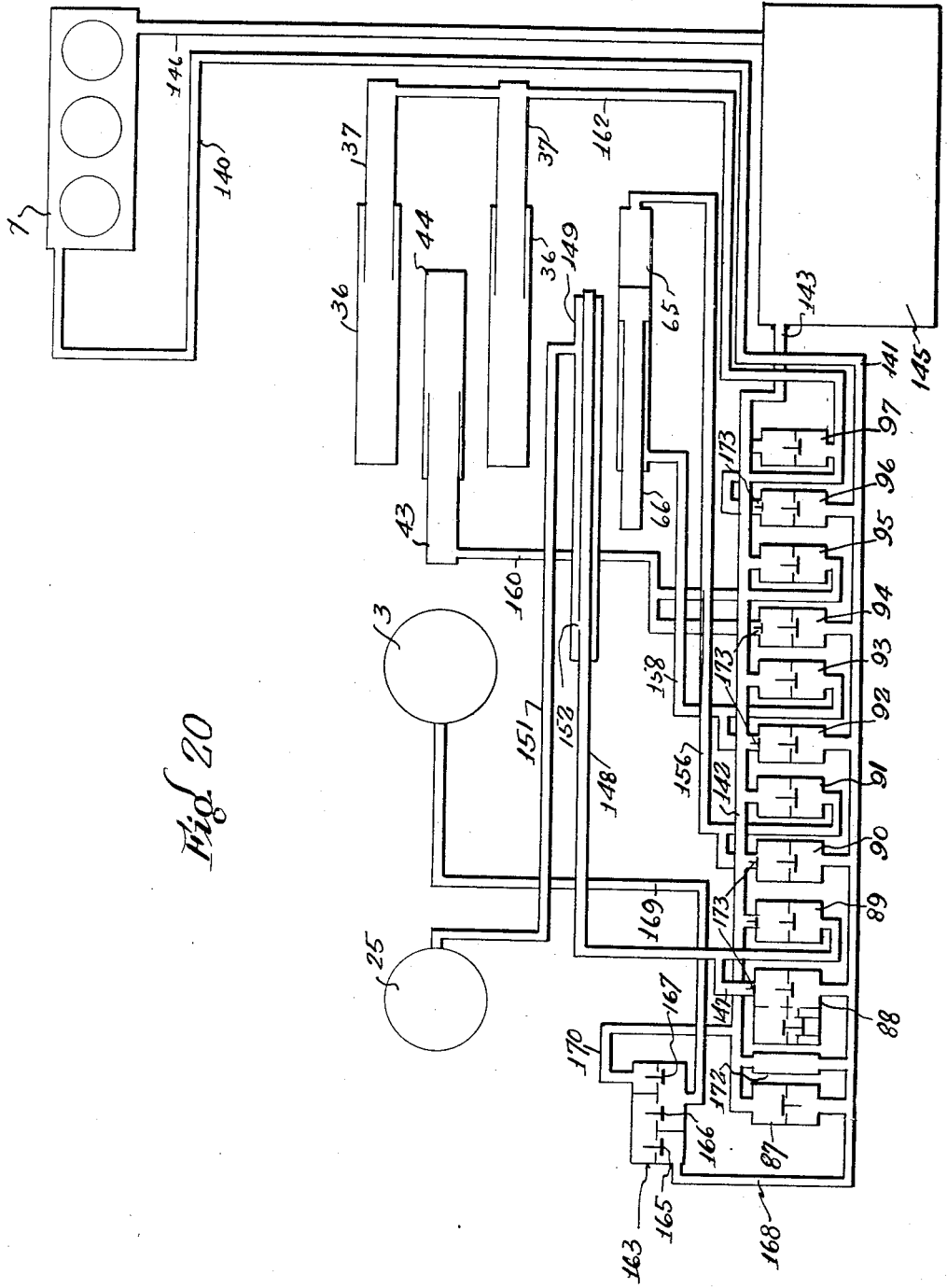

Patented Oct. 17, 1933

1,930,694

UNITED STATES PATENT OFFICE 1,930,694

POWER SHOVEL

William W. Sloane, Chicago, Ill., assignor to Goodman Manufacturing Company, Chicago, Ill., a corporation of Illinois Application November 11, 1929, Serial No. 406,191
Renewed August 26, 1932

10 Claims. (Cl. 214—132)

This invention relates to improvements in power shovels for use in confined spaces, such as in mines, although not limited to this use alone. Specifically the invention relates to the longitudinally movable scoop carrying beam type of power shovel and has among other objects to provide a new and improved structure whereby the length required for the longitudinal operation of the scoop carrying beam is relatively short, and a new and improved means for operating the same all with a view toward general all around convenience and efficiency, particularly where used in confined spaces.

A prior patent, No. 1,692,872, issued to me November 27, 1928, illustrates a power shovel of the type shown in my present invention. My present invention, however, improves on my prior invention and shows a new and improved hydraulic scoop actuating means including the valve mechanism for operating and controlling the same.

Other objects of my invention will appear from time to time as my specification proceeds.

My invention may be more fully understood with reference to the accompanying drawings, wherein:

Figure 3 is a partial rear elevation of the machine illustrated in Figure 1 with parts broken away and in section;

Figure 4 is an enlarged fragmentary sectional view taken on line 4—4 of Figure 1;

Figure 5 is an enlarged fragmentary partial side elevation of the forward portion of the machine illustrated in Figure 1 showing details of the scoop raising and lowering means;

Figure 6 is a partial diagrammatic fragmentary top plan view of the machine with parts omitted, broken away and in section;

Figure 7 is a partial diagrammatic fragmentary side elevation of the machine with parts omitted, broken away and in section;

Figure 8 is an enlarged partial fragmentary top plan view of the machine with parts broken away and in section;

Figure 9 is an enlarged view similar to Figure 7 with different parts omitted and broken away;

Figure 10 is an enlarged view similar to Figure 6 with different parts omitted, broken away, and in section;

Figure 11 is a view similar to Figure 6 with different parts omitted, broken away and in section;

Figure 12 is a view similar to Figure 7 with different parts omitted, broken away and in section;

Figure 13 is an enlarged top plan view of the valves;

Figure 14 is a partial diagrammatic fragmentary side elevation of the valves illustrated in Figure 13 with parts broken away and in section;

Figure 15 is a sectional view taken on line 15—15 of Figure 13;

Figure 16 is a partial sectional view similar to Figure 15 with the valve in a different position than is shown in Figure 15;

Figure 17 is a partial diagrammatic fragmentary side elevation of the valves shown in Figure 13, similar to Figure 14 but with different parts broken away and in section;

Figure 18 is a sectional view taken on line 18—18 of Figure 17;

Figure 19 is a partial diagrammatic side elevation of the valves shown in Figure 13 with parts broken away and in section; and Figure 20 is a diagrammatic view of the fluid pressure system of the machine;

Like numerals refer to like parts throughout the several figures.

Figure 1:
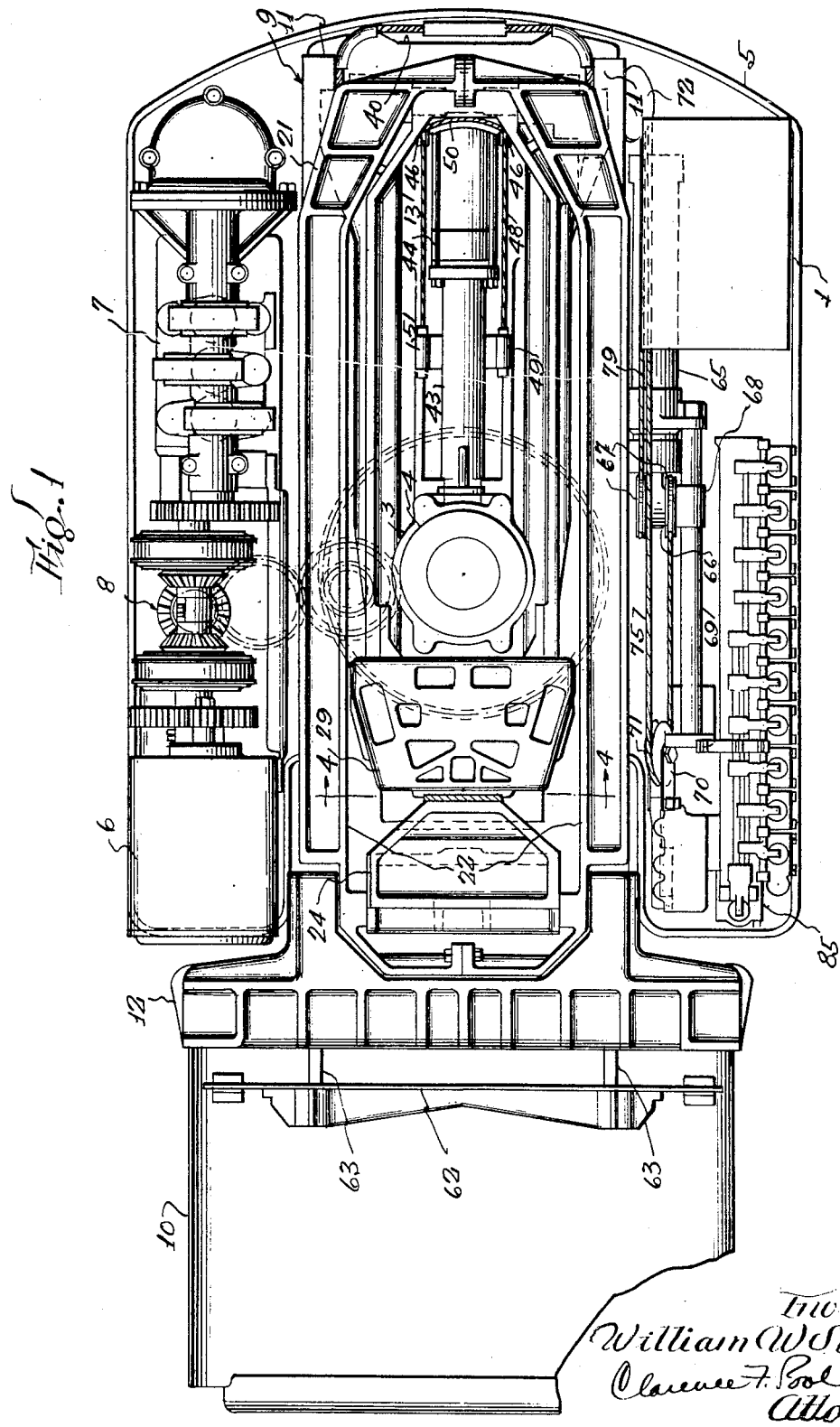
Figure 1 is a top plan view of the power shovel embodying one form of my invention with portions broken away and in section.

In the drawings, 1 designates a base frame which is carried on laterally spaced continuous tread mechanisms 2 of usual construction which are adapted for the propulsion of the shovel.

Mounted centrally of the base frame 1 is a vertically disposed cylinder 3 containing a piston 4 so arranged that said piston may be raised by fluid pressure in said cylinder to engage a fixed part, such as a roof, thus forming a holding jack for the machine while it is in operation.

Figure 2:
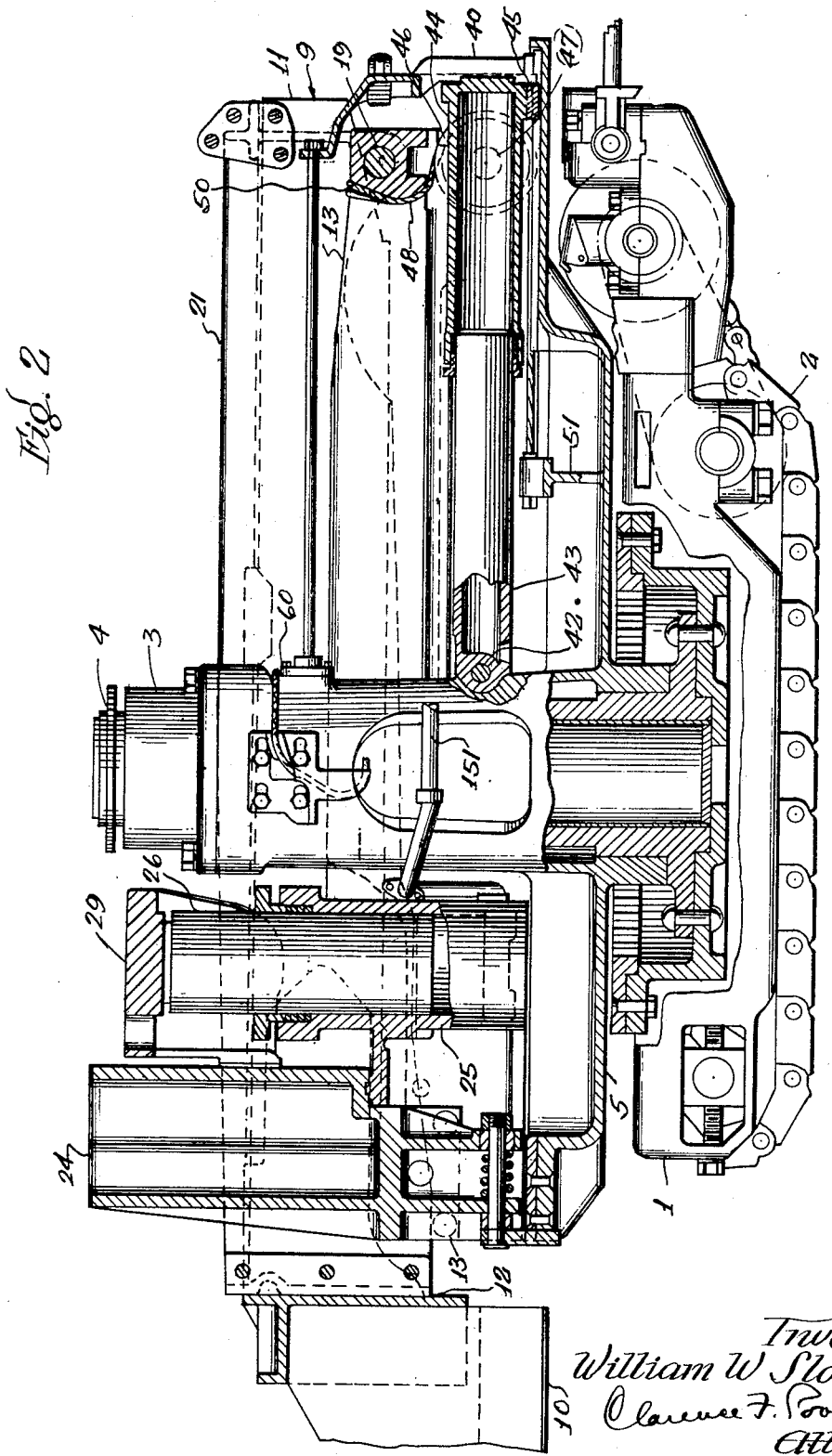
Figure 2 is a partial central longitudinal vertical section of the machine illustrated in Figure 1.

A turntable or rotatable frame 5 is carried by the base 1 for movement axially about the vertically disposed cylinder 3, as best shown in Figure 2, which turntable carries the major part of the operating mechanism.

An electric motor 6 and a fluid pressure pump 7 are mounted on the turntable 5 and are disposed in horizontal longitudinal arrangement along one side thereof. A reduction gear mechanism generally indicated at 8 operably connects the adjacent ends of the shafts of the motor and pump for the operation of the various mechanisms of the machine.

A beam 9 carries a scoop 10 at its front end and comprises two laterally spaced inwardly facing parallel channel members 11 and a single cross structure 12 at the front end of said channel members which forms the rear end of the scoop 10. The beam 9 is carried with the turntable 5 for operative movement in central relation with the hereinbefore described vertical holding jack and with the channel members 11 operating in paths on opposite sides of said jack as follows: (see Figures 1, 2 and 3.)

A support frame 13 is disposed horizontally and longitudinally of the beam 9 in central relation with the holding jack and is mounted for horizontal longitudinal movement on the turntable 5. The support frame 13 extends forwardly and rearwardly of the jack on both sides thereof and is mounted for sliding movement on the floor of the turntable 5 by means of bearings 16 which engage bearing portions 17 at the bottom of said support frame period. A horizontal shaft 19 disposed transversely of the support frame 13 is engaged in bores on the rearward portion of the support frame 13 and has an elevating arm 21 mounted thereon for pivotal movement with respect thereto. The elevating arm 21 extends forwardly from the horizontal shaft 19 to the forward portion of the support frame 13 and is provided with a central vertical opening 22 extending longitudinally thereof to provide clearance for the roof jack. Thus the elevating arm 21 is carried with the support frame 13 for horizontal movement with respect to the turntable 5 longitudinally of the beam 9 and for vertical pivotal movement with respect to said support frame on the axis of the shaft 19. The beam 9 is mounted for movement on and longitudinally of the elevating arm 21 by means of the channel members 11 of said beam, which channel members are slidably engaged in bearings 23 on respective sides of said elevating arm.

As so carried, the beam 9 carrying the scoop 10 is movable vertically by reason of the pivotal mounting of the elevating arm 21 and longitudinally or horizontally by reason of the longitudinal movement of said beam with respect to said elevating arm, and the horizontal longitudinal movement of the support frame 13 with respect to the turntable 5, the longitudinal movement of said beam together with the corresponding movement of said support frame permitting a relatively great longitudinal movement of said beam as compared with the length required for the longitudinal operation thereof.

The support frame 13 is provided on the central portion of its front end with a vertically extending member 24, which member is within the opening 22 of the elevating arm 21 and has bearing engagement with the inner sides of said elevating arm. A vertical lifting cylinder 25 is disposed adjacent the rearward side of the member 24 and has a piston 26 vertically movable therein. A cap piece 29 is provided on the upper end of the piston 26 and has a pair of sheaves 30, 30 on each side thereof, the forward portion of said cap piece having bearing engagement with the rear portion of the vertically extending member 24. Cables 31—31 (see Figures 4 and 5) having one end clamped to opposite sides of a holding member 32 fixed on the support frame 13 extend around guides 34—34 on opposite sides of the support frame 13 upwardly around the sheaves 30, downwardly and rearwardly around holding members 35—35 on the inside portion of the elevating arm 21 and upwardly around the sheaves 30 and downwardly around the guides 34, 34 where their opposite ends are clamped in opposite sides of the holding member 32. Thus introduction of fluid pressure into the cylinder 25 effects upward movement of the piston 26 and cap piece 29 which effects upward movement of the elevating arm 21, beam 9 and scoop 10.

Radial or longitudinal movement of the scoop 10 by longitudinal movement of the beam 9 and the support frame 13 is effected in the following manner (see Figures 1—2—3—8 9 and 10):

Disposed in parallelism with the direction of movement of the support frame 13 and on horizontal axes at respective sides of the holding jack and at the lowermost portion of the support frame 13 adjacent the floor of the turntable 5 and secured on the support frame 13 is a pair of hydraulic cylinders 36 hereinafter referred to as the out cylinders. These cylinders are disposed rearwardly on the support frame 13 and are provided with plungers 37. The plungers 37 are hollow and have their rearward end threaded in a manifold 39 which is supported on the turntable 5 by means of a support member 40 so the introduction of fluid pressure to the plungers 37 through the manifold 39 will effect forward movement of the cylinders 36 and thus move the support frame 13 forwardly in the guides.

Extending rearwardly from the holding jack and attached thereto by means of a pivot pin 42 is a plunger 43 having a cylinder 44 slidably mounted thereon so fluid pressure on said cylinder will move said cylinder along said plunger. The cylinder 44 is slidably mounted on the turntable 5 in a guide 45 and has a pair of sheaves 46—46 carried thereon on transversely extending shafts 47—47 near the rearward end of said cylinder. A cable 48 extends from a clamp 49 on one side of the plunger 43 rearwardly around the respective sheaves 46 upwardly around a grooved anchor means 50 on the support frame 13, downwardly around the opposite sheave 46 and forwardly to a clamp 51 on the turntable 5 on the opposite side of the plunger 43 from the clamp 49. Thus the introduction of fluid pressure into the cylinder 44 effects rearward movement of said cylinder and also effects rearward movement of the support frame 13, elevating arm 21, beam 9 and scoop 10.

Referring now to the manner of operating the beam 9 and scoop 10 longitudinally of the support frame 13 in synchronism with and in greater magnitude than the corresponding movement of the support frame 13, mounted on the outside of respective side portions of the elevating arm 21 near the forward end thereof and lying within the enclosure of the respective channel members 11 of the beam 9 is a pair of sheaves 52, and mounted on the outside of respective side portions of the elevating arm 21 near the rearward end thereof on a transverse axis is a plurality of sheaves, generally indicated at 53 mounted on a common axis side by side. Cables 54, 54 are clamped together at one end by means of a clamping member 55 adjacent the rearward end of the support 40 on the turntable 5. Said cables extend from said clamping member around guides on opposite sides of the support 40 forwardly over respective guide sheaves 56 on opposite sides of the elevating arm 21 around the sheaves 52 and rearwardly to cable anchor members 57 attached to the insides of the respective channel members 11 of the beam 9. Thus forward movement of the support frame 13 effected by the out cylinders 36 is transmitted to the beam 9 to effect forward movement of said beam at twice the rate of movement of the support frame 13 by means of the cables 54 engaged with the turntable 5 and beam 9 and the sheaves 52 operating in an obvious manner.

Likewise a cable 60 is anchored to the holding jack intermediate its ends. The cable 60 extends rearwardly from opposite sides of said holding jack around the respective sheaves 53 and forwardly to the cable anchor members 57 on the insides of the respective channel members 11 of the beam 9. Thus rearward movement of the support frame 13 effected by the in cylinder 44 is transmitted to the beam 9 to effect rearward movement of said beam at twice the rate of movement of the support frame 13 in an obvious manner, by means of the cable 60 anchored intermediate its ends on the holding jack and engaged with the sheaves 53 and beam 9.

The scoop 10 is provided with an ejector 62 which is carried for movement longitudinally of said scoop on the front ends of bars 63 extending longitudinally of the beam 9 and mounted on the outsides of the respective channel members 11 for longitudinal sliding movement therealong. See Figures 11 and 12.

Mounted on the turntable 5 and extending longitudinally of the support frame 13 and disposed on the left hand side thereof is a double acting fluid pressure actuating device comprising a cylinder 65 having a double acting plunger 66 therein and extending forwardly therefrom. The plunger 66 carries a pair of sheaves 67 on its front end. Adjacent the outer sheave 67 and attached to the plunger 66 is a guide member 68 which rides on guides 69, 69. Disposed forwardly on the turntable 5 is a bracket 70 on which is mounted a sheave 71. Mounted on the support frame 13 beneath the left hand sheave 53 is a pair of sheaves 72. Mounted on the beam 9 on vertical axes at the front ends of respective channel members 11 are pairs of sheaves 73, openings being provided in the elevating arm and beam structure for this purpose. A sheave 74 is mounted on the in side of the right hand channel member 11 near the rearward end thereof. A cable 75 has one end thereof secured to the bracket 70 and extends rearwardly therefrom and is trained over one of the sheaves 67. It then extends forwardly from the sheave 67 to the sheave 71 and is trained thereover, from whence it extends rearwardly and is trained over one of the sheaves 72 and extends forwardly therefrom and is secured to a member 76 fixed to the rear end of the left hand bar 63 for the ejector 62. A cable 77 is secured to the forward end of the member 76 and extends forwardly therefrom and is trained around the left and right hand lower sheaves 73. From thence this cable 77 extends rearwardly and is trained over the sheave 74 and extends forwardly having its other end secured to a member 78 fixed to the right hand bar 63. Thus rearward movement of the plunger 66 effects rearward movement of the ejector 62.

A cable 79 has one end secured to a bracket 80 on the turntable 5 to the rear of the front end of the cylinder 65. This cable 79 extends forwardly from the bracket 80 and is trained over the other sheave 67. From thence it extends rearwardly and is trained over the other sheave 72. The cable 79 extends forwardly from the sheave 72 over a guide roller 81 and around the respective upper sheaves 73 rearwardly to the member 78 to which it is secured. Thus forward movement of the plunger 66 operates through the cable 79 to move the ejector 62 forwardly along the scoop 10.

Referring now in particular to the hydraulic system and novel arrangement of valves for controlling fluid pressure flowing through said hydraulic system, gang valves generally indicated at 85 have been provided which are mounted on the turntable 5 on the side opposite from the electric motor 6 and pump 7 and extend longitudinally therealong.

The gang valves 85 are constructed as follows: See Figures 1 and 13 to 19, inclusive. A longitudinally extending vertically disposed manifold 86 is secured on the turntable 5 and secured on the vertical outer face of said manifold are a plurality of poppet valves. These poppet valves include a throttle valve 87 on the forward end of the manifold 86, a dual vertical cylinder control valve 88 on the outer longitudinal face of the manifold 86 and nine vertically disposed poppet valves 89, 90, 91, 92, 93, 94, 95, 96 and 97, respectively. These valves are similar in construction, each comprising a stem 99 and a piston 100, spaced vertically upwardly from a head 101 of the valve, which head is adjusted to engage a seat in a usual manner. These valves have a by-pass 102 in the body of the valve communicating the upper side of the head 101 with the lower side of the piston 100 to balance the pressure on the upper side of said valve head. A spring 103 is provided to move the valve head 101 into closed position upon release of pressure on the valve stem 99.

The valve 88 is similar to the valves 89 to 96, inclusive, as is shown in detail in Figure 14 and has an auxiliary valve 104 integral therewith, which valve serves as an auxiliary check valve to prevent chattering of the vertical cylinder 25 as it is being raised or lowered.

The valves 87 to 97, inclusive, are operated by suitable hand levers, such as is partially illustrated at 109. A hand lever such as is partially illustrated at 109 is insertable in lever sockets 110, 111 and 112. The lever sockets 110, 111 and 112 are pivotally mounted on a transverse shaft 114 and have operable connection with valve operating bars 116, 117 and 118, respectively, for moving said bars longitudinally of the manifold 86. The lever socket 110 has a tooth 119 projecting downwardly below the shaft 114 and having engagement with a notch 120 for reciprocably moving the valve operating bar 116 on pivotal movement of the tooth 119. Similarly, a tooth 121 depends from the lever socket 111 and has engagement with a notch 122 in the valve operating bar 117, and a tooth 123 depends from the lever socket 112 and has engagement with a notch 124 in the valve operating bar 118. Thus reciprocable movement of any one of the levers 109 causes reciprocable longitudinal movement of the respective valve operating bars 116, 117 or 118. The top portion of the valve operating bar 116 (see Figure 17) has a plurality of cams, indicated at 125, thereon which engage rollers 126 on rocker arms 127 which engage the valve stems 99 of the valves 90, 91, 92 and 93, respectively, for operating said valves on longitudinal movement of the valve operating bar 116. Similarly, the valve operating bar 117 (see Figure 14) has a cam 128 thereon which engages rollers 129 on rocker arms 130 for operating the valves 88 and 89. Figure 19 shows cams, generally indicated at 131 on the valve operating bar 118 for operating the valves 94, 95, 96 and 97 through rocker arms 132 and rollers 133 which ride on said cams.

A rocker arm 134 disposed on a transverse axis is provided to operate the throttle valve 87. The rocker arm 134 has a relatively wide roller 135 thereon which is engageable with a depression, such as is shown at 136 in Figure 17, in each of the valve operating bars 116, 117 and 118 at the forward end of said bars so said valve may be opened or closed upon longitudinal movement of the respective valve operating bars 116, 117 and 118.

Referring particularly to Figure 20, fluid is circulated from the pump 7 through a high pressure pipe 140 which connects with a passage 141 of the manifold 86 which in turn communicates with the valves 87, 88, 90, 92, 94 and 96. These valves are normally closed and the valve 87 is normally open so under idling conditions with the pump operating, the fluid passes from the pump through the valve 87 into a passage 142 in the manifold 86 and from thence into a return pipe 143 leading into a storage tank 145 on the turntable 5 rearwardly on the same side of said turntable as the manifold 86 is disposed. The pump 7 draws fluid from the tank 145 through a pipe 146.

It will be observed that the valve 87 by-passes the fluid pressure from the pump 7 and it is accordingly termed the bypass or throttle valve, and the valves 88, 90, 92, 94 and 96 serve for selectively applying the pressure from the pump to the hydraulic actuating devices and are accordingly hereinafter termed pressure valves. The valves 89, 91, 93, 95 and 97 communicate with the passage 142 and serve for selectively releasing fluid from the hydraulic devices and are accordingly hereinafter termed release valves.

A high pressure pipe 147 leads from the manifold 86 and valve 87 to a longitudinally extending pipe 148. A pipe 149 surrounds the pipe 148 and is provided at the ends thereof with bearing and packing structures 150 which engage the pipe 148 for sliding movement to permit movement of the pipe 149 along the pipe 148. See Figures 6 and 7. A pipe 151 leads from the pipe 149 and communicates with the vertical lift cylinder 25. The pipe 148 is secured to the turntable 5 and the pipe 149 is secured to the support frame 13 and slides along the pipe 148 thus providing for relative movement between the support frame 13 and turntable 5. The pipe 148 is provided with apertures 152 so arranged that they lie between the bearing and packing structures 150 in all relative positions of the support frame 13 and turntable 5.

It may thus be seen that a sliding joint has been provided permitting relative movement of the support frame 13 and turntable 5, and that this sliding joint is balanced so fluid pressure therein has no tendency to effect movement of the support frame 13. It may also be seen that movement of the lever socket 111 about its pivotal axis by means of the lever 109 in one direction moves the valve operating bar 117 forwardly which opens the pressure valve 87 to raise the piston 26 in the vertical lifting cylinder 25 while movement of the valve operating bar 117 rearwardly through the tooth 121 and lever socket 111 allows the pressure valve 88 to close and opens the release valve 89 and throttle valve 87 to release fluid pressure from the vertical cylinder 25 to allow the piston 26 to return to its initial lowered position in the vertical cylinder 25, and thus raise or lower the elevating arm 21 and beam 9.

A passage 155 in the manifold 86 communicates with the pressure valve 90 above the head thereof and with the release valve 91 below the head thereof and a pipe 156 leads from this passageway to the head or rearward end of the ejector cylinder 65. Likewise a passage 157 in the manifold 86 communicates with the pressure valve 92 above the head thereof and with the release valve 93 below the head thereof, and a pipe 158 leads from this passageway to the forward end of the ejector cylinder 65. Thus when the valve operating bar 116 is moved rearwardly by means of the tooth 119, the throttle valve 87 is closed, the pressure valve 90 is opened and the release valve 93 is opened to admit pressure into the rearward end of the ejector cylinder 65 and release pressure from the forward end of said ejector cylinder. Similarly, when the valve operating bar 116 is moved forwardly the throttle valve 87 is closed and the pressure valve 92 and release valve 91 are opened. Thus fluid pressure is admitted into the forward end of the ejector cylinder 65 and released from the rearward end of said ejector cylinder to move the plunger 66 rearwardly in said ejector cylinder.

A passage 159 in the manifold 86 communicates with the pressure valve 94 above the head thereof and the release valve 95 below the head thereof and a pipe 160 leads from this passageway to the radial in cylinder 44. Likewise, a passage 161 in the manifold 86 communicates with the pressure valve 96 above the head thereof and the release valve 97 below the head thereof, and a pipe 162 leads from this passageway to the radial out cylinders 36, 36. Thus when the valve operating bar 118 is moved rearwardly by means of the tooth 123 and lever 109 inserted in the socket 112, the pressure valve 96 is opened to apply pressure to the radial out cylinders 36, the throttle valve 87 is closed and the release valve 96 is opened to release pressure from the in cylinder 44. Similarly, when the valve operating bar 118 is moved forwardly, the throttle valve 87 is closed, the pressure valve 94 is opened to apply pressure to the radial in cylinder, and the release valve 97 is opened to release pressure from the radial in cylinder 36.

Jack valves 163 are provided to admit or release fluid pressure to the holding jack cylinder 3 and comprise three poppet valves 165, 166 and 167. Fluid pressure from the high pressure passage 141 is conducted to the jack valves 163 which are manually operated in a manner unnecessary to be described, through a pipe 168. A pipe 169 leads from the jack valves 163 to the vertical jack cylinder 3 while a pipe 170 leads from the valve 167 to the low pressure passage 142. When the valve 165 is open fluid pressure from the pump 7 passes through this valve and opens the valve 166 which opens with the pressure and passes into the jack cylinder 3 to exert upward pressure on the piston 4. While the valve 165 is open the valve 166 serves as a check valve to prevent fluid from flowing from the jack cylinder back into the pressure pipe 169 when the pressure in the pressure pipe 169 drops as by the opening of the valve 87, which it will be observed is normally open. Thus in order to operate the jack it is necessary to close the valve 87 with the valve 165 open by operating the shovel itself; as, for instance, pushing the scoop 10 outwardly or applying fluid pressure to the vertical cylinder 25. The fluid in the jack cylinder is released by opening the valve 167, as is obvious.

A safety valve 172 is connected across the passages 141 and 142 of the manifold 86 and operates to release excessive pressure developed by the pump 7, and is of an ordinary construction, as shown diagrammatically in Figure 20.

An automatic check valve 173 is provided between each of the pressure valves 88, 90, 92, 94 and 96 and the respective hydraulic actuating devices, and these check valves are arranged to open with the fluid pressure from the pump 7 and to close with pressure from the opposite direction to prevent pressure developed in the several hydraulic devices from passing into the passage 141 when the pressure in said passage drops. These valves are of an ordinary construction and are disposed in the manifold 86 as is clearly shown in Figures 15 and 16.

It will be observed that a lever connected to the lever socket 112 controls the longitudinal movement of the beam, that a lever connected to the lever socket 111 controls vertical movement of the beam and that a lever connected to the lever socket 110 controls movement of the ejector 62. The construction and arrangement of the platform valves and the control mechanism thereof, provides a simple and effective selective control, particularly with a view towards accessibility of the valve mechanism and simplicity and ease of manipulation.

The power shovel is propelled about the mine from working plane to working plane on the continuous tread devices 2 which are driven by the motor 6 through a suitable gear train in a usual manner which will not herein be described in detail since it is no part of my invention.

While I have shown herein and described one form of my invention, I do not wish to be limited to the precise details of construction or arrangement of parts herein shown and described except as specifically limited in the appended claims.

I claim as my invention:

1. In a power shovel, a frame, a support member mounted on said frame for horizontal bodily movement therealong, a beam having a scoop thereon mounted on said support member, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam, and means for vertically moving said elevating arm about its pivotal axis comprising a vertically disposed fluid pressure actuating device on said support member near the forward end thereof, cable guide means on said fluid pressure actuating device adjacent the upper end thereof and a cable fixed to said support member and said elevating arm and threaded over said cable guide means on said fluid pressure actuating device.

2. In a power shovel, a frame, a support member mounted on said frame for horizontal bodily movement therealong, a beam having a scoop thereon mounted on said support member, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam, and means for vertically moving said elevating arm about its pivotal axis comprising a vertically disposed fluid pressure actuating device mounted on said support member near the forward end thereof including a vertically disposed cylinder having a piston movable therein and flexible power transmitting means interposed between said support member and said elevating arm and having operative engagement with said piston.

3. In a power shovel, a frame, a support member mounted on said frame for horizontal bodily movement therealong, a beam having a scoop thereon mounted on said support member, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam, and means for vertically moving said elevating arm about its pivotal axis comprising a vertically disposed fluid pressure actuating device mounted on said support member near the forward end thereof including a vertically disposed cylinder having a piston movable therein, a plurality of sheaves mounted on and movable with said piston adjacent the upper end thereof, and a plurality of cables fixed at their ends in said support member and passing over said sheaves and fixed intermediate their ends to said elevating arm.

4. In a power shovel, a frame, a motor on said frame, hydraulic means on said frame for actuating said shovel including a hydraulic pump driven from said motor and hydraulic pressure control valves connectible with said pump, a support member mounted on said frame for horizontal bodily movement therealong, a beam having a scoop thereon, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam, and means for vertically moving said elevating arm about its pivotal axis comprising a vertically disposed fluid pressure actuating device on said support member, flexible power transmitting means interposed between said support member and said elevating arm and having operative engagement with said fluid pressure actuating device, and compensating longitudinally movable fluid pressure transmitting means connecting said pressure control valves with said fluid pressure actuating device to allow for relative movement of said support member with respect to said frame.

5. In a power shovel, a frame, hydraulic means on said frame for actuating said shovel including a hydraulic pump and hydraulic pressure control valves connectible therewith, a support member mounted on said frame for horizontal bodily movement therealong, a beam having a scoop thereon, means carrying said beam and scoop for elevating said beam with respect to said frame comprising an elevatnig arm, said beam being mounted on said elevating arm for longitudinal movement therealong, said elevating arm being pivotally mounted on said support member at the rearward end thereof for vertical movement about a horizontal axis extending transversely of said beam, and means for vertically moving said elevating arm about its pivotal axis comprising a vertically disposed fluid pressure actuating device on said support member, flexible power transmitting means interposed between said support member and said elevating arm and having operative engagement with said fluid pressure actuating device, and fluid pressure transmitting means for connecting said pressure control valves with said fluid pressure actuating device to allow for relative movement of said support member with respect to said frame comprising a pipe connected to said fluid pressure actuating device having a sliding connection with a pipe connected to said hydraulic pressure control valves.

6. In a power shovel, a frame, a support member mounted on said frame for horizontal bodily movement therealong, a beam having a scoop thereon mounted on said support member, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam and extending forwardly along said support member to a point beyond the forward end thereof, vertical guide means disposed centrally of said elevating arm engageable with the inner sides thereof, and means for vertically moving said elevating arm about its pivotal axis comprising a vertically disposed fluid pressure actuating device on said support member rearwardly of said vertical guide means and having sliding engagement therewith, and flexible power transmitting means interposed between said support and said elevating arm and having operative engagement with said fluid pressure actuating device.

7. In a power shovel, a frame, a support member mounted on said frame for horizontal bodily movement therealong, a beam having a scoop thereon mounted on said support member, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam and extending forwardly along said support member to a point beyond the forward end thereof, vertical guide means disposed centrally of said elevating arm engageable with the inner sides thereof, and means for vertically moving said elevating arm about its pivotal axis comprising a vertically disposed fluid pressure actuating device on said support member rearwardly of said vertical guide means including a vertically disposed cylinder having a piston movable therein, a cap piece on said piston having sliding engagement with said vertical guide means, cable guide means on said cap piece, and a cable interposed between said support member and said elevating arm and having operative engagement with said cable guide means on said cap piece.

8. In a power shovel, a frame, a support member mounted on said frame for horizontal bodily movement therealong, a beam having a scoop thereon mounted on said support member, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam and extending forwardly along said support member to a point beyond the forward end thereof, vertical guide means disposed centrally of said elevating arm engageable with the inner sides thereof, and means for vertically moving said elevating arm about its pivotal axis comprising a vertically disposed fluid pressure actuating device on said support member rearwardly of said vertical guide means including a vertically disposed cylinder having a piston movable therein, a cap piece on said piston having sliding engagement with said vertical guide means, a plurality of sheaves supported on said cap piece on each side thereof, the top portion of said sheaves being beneath the top portion of said cap piece, and a plurality of cables fixed at their ends in said support member, fixed intermediate their ends on said elevating arm, and passing over and having operative engagement with said sheaves for raising said elevating arm upon upward movement of said piston.

9. In a power shovel, a frame, a motor on said frame, hydraulic means on said frame for actuating said shovel including a hydraulic pump driven from said motor and hydraulic pressure control valves connectible with said pump, a support member mounted on said frame for horizontal bodily movement therealong, a beam having a scoop thereon, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam and extending forwardly along said support member to a point beyond the forward end thereof, vertical guide means disposed centrally of said elevating arm having sliding engagement with the inner sides thereof, means for vertically moving said elevating arm about its pivotal axis comprising a vertically disposed fluid pressure actuating device on said support member rearwardly of said vertical guide means and having sliding engagement therewith, flexible power transmitting means interposed between said support and said elevating arm and having operative engagement with said fluid pressure actuating device, and compensating longitudinally movable fluid pressure transmitting means connecting said pressure control valves with said fluid pressure actuating device to allow for relative movement of said support member with respect to said frame.

10. In a power shovel, a frame, a motor on said frame, hydraulic means on said frame for actuating said shovel including a hydraulic pump driven from said motor and hydraulic pressure control valves connectible with said pump, a support member mounted on said frame for horizontal bodily movement therealong, a beam having a scoop thereon, means carrying said beam and scoop for elevating said beam with respect to said frame comprising an elevating arm, said beam being mounted on said elevating arm for longitudinal movement therealong, said elevating arm being pivotally mounted on said support member at the rearward end thereof for vertical movement about a horizontal axis extending transversely of said beam and extending forwardly along said support member to a point beyond the forward end thereof, vertical guide means disposed centrally of said elevating arm having sliding engagement with the inner sides thereof, means for vertically moving said elevating arm about its pivotal axis comprising a vertically disposed fluid pressure actuating device on said support member rearwardly of said vertical guide means and having sliding engagement therewith, flexible power transmitting means interposed between said support and said elevating arm and having operative engagement with said fluid pressure actuating device, and fluid pressure transmitting means connecting said pressure control valves with said fluid pressure actuating device to allow for relative movement of said support member with respect to said frame comprising a pipe connected to said fluid pressure actuating device having sliding connection with a pipe connected to said hydraulic pressure control valves.

WILLIAM W. SLOANE.